Sept. 8, 1931.                J. R. KLINGER                1,822,223
            CONSTRUCTION OF SHIPS, BOATS, AND THE LIKE
                    Filed Oct. 15, 1928      3 Sheets-Sheet 1
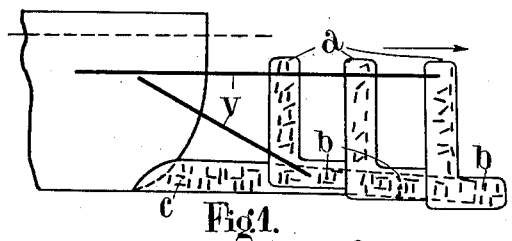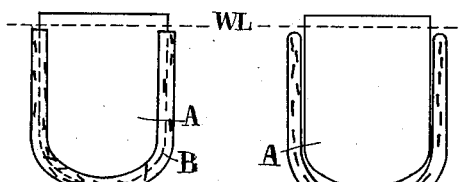
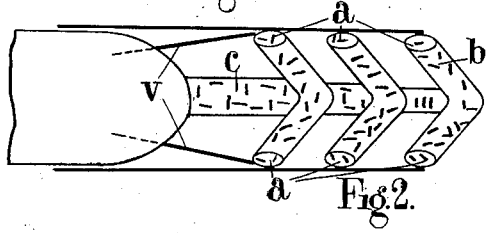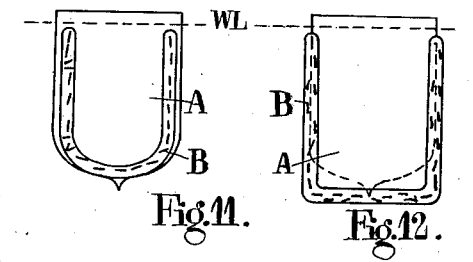
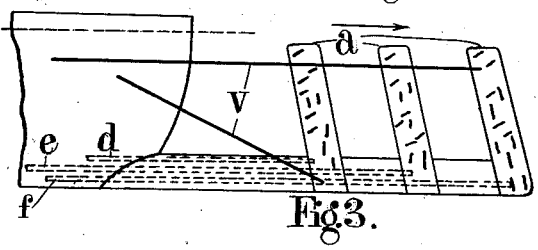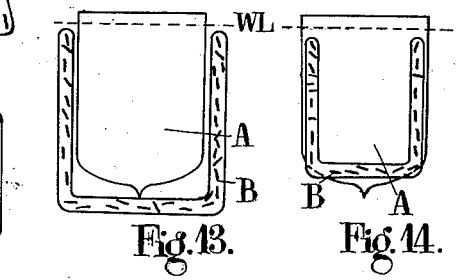
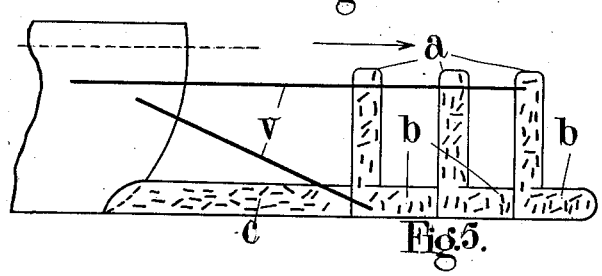
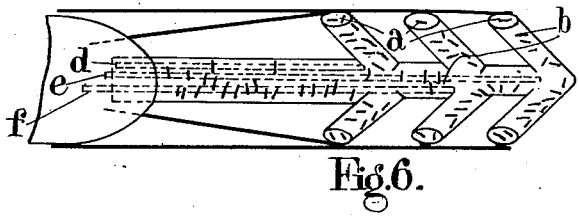

Sept. 8, 1931. J. R. KLINGER 1,822,223
CONSTRUCTION OF SHIPS, BOATS, AND THE LIKE
Filed Oct. 15, 1928 3 Sheets-Sheet 2
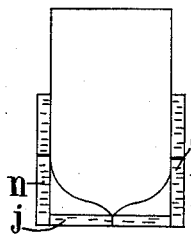
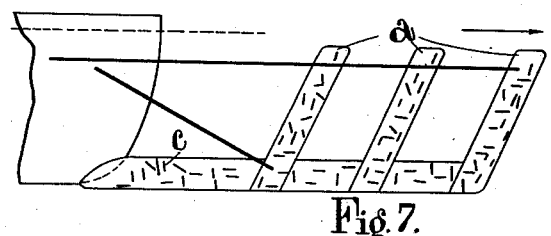
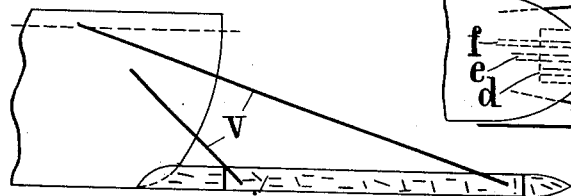
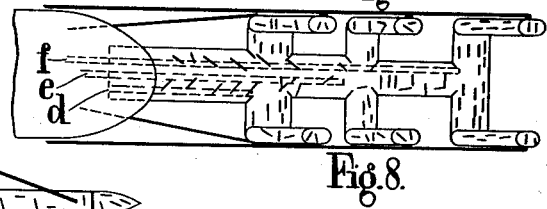
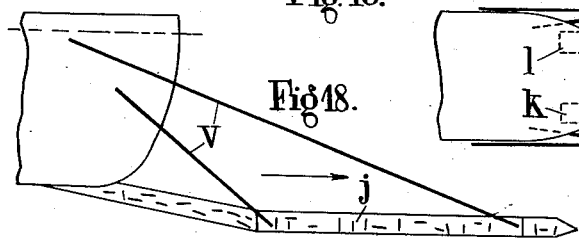
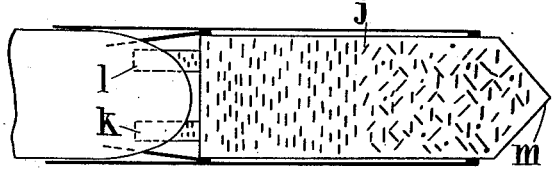
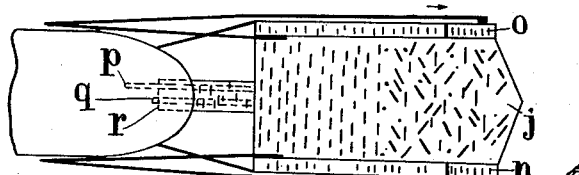
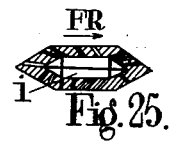
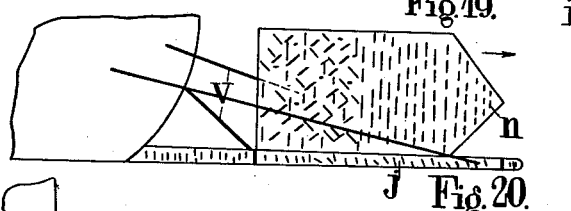
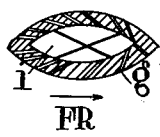
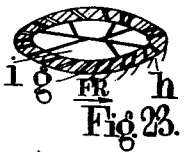
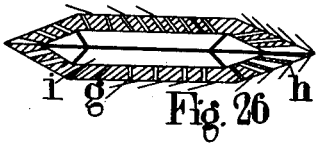
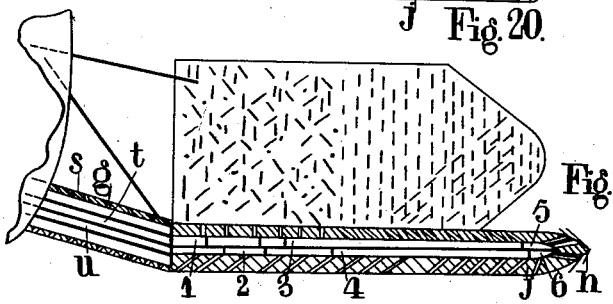

Sept. 8, 1931.  J. R. KLINGER  1,822,223
CONSTRUCTION OF SHIPS, BOATS, AND THE LIKE
Filed Oct. 15, 1928  3 Sheets-Sheet 3

Patented Sept. 8, 1931

1,822,223

UNITED STATES PATENT OFFICE

JOHANN RUDOLF KLINGER, OF NORD-BOHMEN, CZECHOSLOVAKIA

CONSTRUCTION OF SHIPS, BOATS AND THE LIKE

Application filed October 15, 1928, Serial No. 312,640, and in Czechoslovakia October 27, 1927.

Ships as hitherto constructed encounter a substantial resistance during their movement in the water, whereby their speed is reduced and a large amount of power is consumed. Various proposals have already been put forward for reducing the skin friction by passing air over the walls of the ship, without however, any real progress having been made.

In the construction according to the present invention, the resistance of the ship which opposes the displacement of the water is further substantially reduced by the provision, at any suitable distance and at any suitable height in front of the ship, of pipes, pipe-like structures or other hollow bodies having any desired number of openings, of any desired section, from which air, gas, or a gas mixture or a mixture of air and gas or gases is blown out under pressure. In connection therewith it has to be borne in mind that the resistance which is encountered in the water by the escaping air or the like varies. In the lower layers of water, the resistance which the blown-out air has to overcome is, for instance, greater than in the higher layers of water, this being due to the hydrostatic pressures being different. Further, the pressure opposing the blowing out of the air on the parts of the pipes or pipe-like structures facing the front is, owing to the hydrodynamic pressure that also comes into question in this case, greater than on the side portions of the pipes or pipe-like structures at the same height, whilst on the rear parts of the pipes or pipe-like structures the pressure or resistance acting against the escape of the air or the like is comparatively small and it can even have a suction effect. It follows therefrom that the air or the like has to be suitably blown out with different pressures, according to the position of the blow-out points, and that, moreover, the dimensions of the surfaces of the pipes or pipe-like structures facing the front should be as small as possible as compared with the surfaces which face in the other directions.

In the accompanying drawings, which illustrate, diagrammatically and by way of example, different forms of construction according to the invention, Figures 1 and 2 are an elevation and plan view respectively of one form of construction of the pipe-like perforated attachment, Figures 3 and 4 are similar views of a second form of construction, Figures 5 and 6 are similar views of a third form of construction, whilst Figures 7 and 8 are also an elevation and plan view respectively of a further modification.

Figures 9, 10, 11, 12, 13, 14 and 15 illustrate diagrammatically front end views of different constructions and are intended to show how greatly the general relative arrangement of the front of the ship and of the attached device constructed according to the invention may differ.

Figures 16 and 17 are an elevation and plan view respectively of a construction in which use is made of a horizontal hollow plate, whilst Figure 18 is an elevation of a slightly modified construction.

Figures 19 and 20 are a plan view and an elevation of a modification in which a bottom plate is continued by side plates, whilst Figure 21 is a sectional elevation of a modified construction.

Figures 22, 23, 24, 25 and 26 show various cross sections of the pipe-like perforated attachments.

Figure 27:
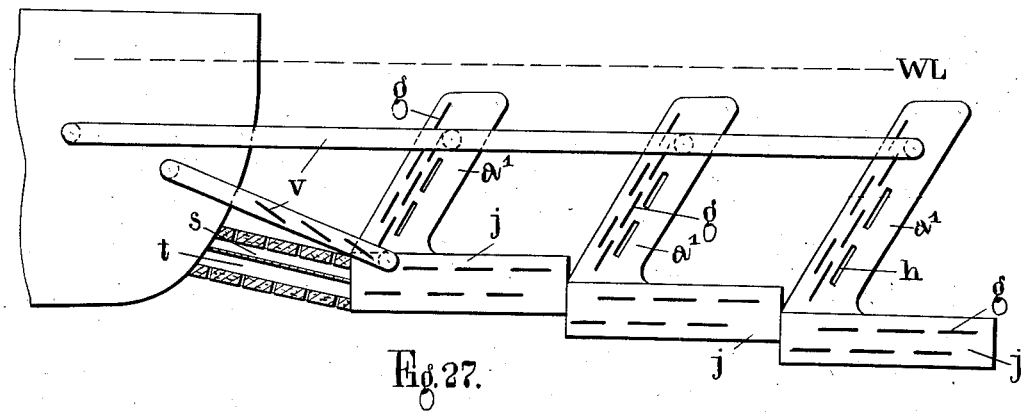
Figures 27 and 28 show diagrammatically in elevation and in plan respectively a further form of the invention.

It will be seen from Figures 9 to 15 that the difference between the surface A of the ship facing the front and considered below the water line WL, and the surface B of the pipes or pipe-like structures or plate-like hollow bodies facing the front, is very substantial. This difference may be even greater than shown on the drawings, in which case the efficiency of the construction according to the invention is further increased. The air or the like which is blown out of the pipes or pipe-like structures, traverses the water in an upward direction and, at the same time, ascends with respect to the ship in a rearward direction, so that the ship in its forward movement encounters only a comparatively small resistance, more especially at the bow.

In this way a substantial part of the ship's resistance is eliminated, on the one hand the water-displacement or wave-making resistance, which opposes the forward displacement of the ship, and on the other hand the frictional resistance between the ship's hull and the water. Owing to air or the like being blown out of the aforementioned pipes or pipe-like structures and the plate-like hollow bodies hereinafter described, a sort of channel-shaped furrow or trough is formed in front of the ship, consisting mainly or to a considerable extent of air or gas and only the remainder consisting of water, whereby the density of water in front of the ship is considerably diminished.

The pipes or pipe-like structures may be constructed so as to have approximately the shape of the sides of the ship ascending from the keel or any other similar form, for instance be U-shaped, with the two sides directed upwardly. For this purpose, these pipes or pipe-like structures are not provided directly at the bow of the ship but are arranged slightly in front of the same, the side limbs $a$ being either vertical, as shown in Figures 1 and 5, or inclined rearwardly, as shown in Figure 3, or inclined towards the front, as shown in Figure 7. Figure 1 shows a step-like arrangement of the lower parts $b$ of the pipes, which form of construction is preferred in the case of high speed ships. For reasons of stability the lower parts $b$ of the pipes provided in front of the ship, are generally so arranged as to lie not below or not substantially below the horizontal plane of the keel line. In the case of ships, boats or the like which have no keels, any reference in this specification or in the claims appended thereto to the horizontal plane of the keel line is to be understood as meaning the horizontal plane of the bottom of the vessel. In Figures 2 and 6 the lower parts of the pipes are shown as forming a V with the point directed towards the front. In the form of construction illustrated in Figures 1 and 2, the admission of air to the pipe parts $b$ which lie horizontally is effected through the lower pipe $c$, whilst in the forms of construction illustrated in Figures 3–8, it is effected by the individual pipes $d$, $e$, $f$, which lie approximately at the same height as the said horizontal pipe parts $b$ through which the air is blown out.

The cross sections of the blow out pipes may have any of the cross sections shown, by way of example, in Figures 22–26, the direction of movement of the ship being indicated by the arrows F R. The outlet openings $g$ may be in the form of slots having any desired direction, or be of any other form. In Figs. 23 and 26, the outlet openings $g$ have also been provided with nozzles $h$, whilst the cross sections illustrated also show cells, chambers or channels $i$ which permit different pressures to be used during the operation.

The number and the distances of the pipes from the ship mainly depend upon the speed of the ship that it is desired to attain. The greater the speed of the ship, especially if the engines are made powerful with this purpose in view, the further away from the front have the pipes or pipe-like structures to be provided, the number of the pipes being as great as possible, and the pipes being arranged one behind the other in front of the ship and, if desired, in steps.

As will be seen from the drawings, the air or the like may be blown inwardly, to the front, backwardly, or outwardly or in any intermediate direction; similarly in a downward direction or inclined in a downward direction.

As the pipes or other hollow bodies have to work at different pressures, more especially as the pressure which has to overcome the resistance of the water varies, the same may be subdivided. For this purpose separate air admission pipes may be provided for each one of the U-shaped or U-like pipes or pipe-like structures, as shown by $d$, $e$, $f$ in Figures 3–8. Further, separate air admission pipes may lead to the individual cells, chambers or channels shown in Figures 22–26.

Instead of pipes or pipe-like structures being provided for the blowing out of air or the like, one or more hollow plate or plates may be arranged in front of the ship at any desired height horizontally or inclined but parallel to the longitudinal axis of the ship, which hollow plate or plates has or have openings which may be used in conjunction with outlet nozzles. In order that the escaping air may extend as uniformly as possible over the entire breadth or height of the hollow bodies the slots may be staggered, as shown more particularly in Figures 17, 19, 20 and 21. These hollow plates may lie in the horizontal plane of the keel line or slightly below the said plane, but in any case in front of the ship. The hollow plates may be arranged one behind the other and in steps. From the openings, which may be associated with outlet nozzles, the air or the like is blown out under pressure and traverses the water in an upward direction or ascends rearwardly with respect to the ship, and in this manner the ship which is pushing forward encounters only a small resistance at the bow.

The hollow plate or plates should be of small dimensions as regards their height, so that the ship does not thereby encounter a substantially increased resistance in the water. Further, the surface which faces the front and in which openings may also be provided, and, if desired, also outlet nozzles for the escape of the air or the like should, owing to the forward high hydrodynamic pressure, be as small as possible. The hollow plate may be made of any desired width; however, it is an advantage that its width shall be approximately the same as that of the ship and not much greater than it. Any reduction in the height and width of the plate effected with the object of avoiding substantial hydrodynamic pressure resistance at the front of the plate or plates can be made good in the length of the plates by causing large quantities of air to ascend in the form of threads, strips and bubbles in front of the ship, thereby considerably reducing the resistance of the water.

For the purpose of the invention, the hollow plate or plates are not provided directly on the front of the ship but a certain distance in front of the bow. The higher the speed of the ship, especially if the engines are made powerful with this purpose in view, the further away from the bow of the ship should the plate or plates be arranged. Use may be made of several hollow plates arranged in front of the ship one beyond the other and, if desired, in step formation, or one single hollow plate may be employed which extends a long distance forward at a suitable height, for instance, in a horizontal plane which lies slightly below the horizontal plane of the keel line, so that the air can be blown out or started to be blown out a long way in front of the ship.

The hollow plate or plates arranged for instance horizontally and having openings which, if desired, may be provided with outlet nozzles for the blowing out of the air, may be continued directly or indirectly in an upward direction, for instance vertically. Alternatively, hollow plates arranged in the direction of movement and lying in an upward, for instance inclined position, may be constructed as above described so as to be capable of blowing out the air without use being made of a horizontal or nearly horizontal hollow plate.

The plates above described may be combined in such a way that, considered from the front, they have a shape which is similar or corresponds to the outer sides of the ship ascending from the keel. This combination of plates seen from the front, may also be of U or like shape, all the parts of the plate surface in contact with the water being preferably provided with outlet openings and, if desired, with outlet nozzles for blowing out the air.

The front part of the plate or plates may, for the purpose of obtaining a more favourable form, finish into an edge or be rounded off. The hollow plates may also, for the purpose of effecting a gradation in the pressure, be subdivided by forming cells, chambers or channels.

The hereinbefore described pipes or pipe-like structures or hollow plate or plates should, if possible, not project beyond the water line WL. The means provided for blowing out the air or the like may also be suitably applied to all the parts which are associated with the pipes or pipe-like structures or hollow plates, for instance the air admission pipes, bracings, and the like.

Figs. 16 and 17 show the arrangement of a horizontal hollow plate $j$ which is provided with two air admission pipes $k$ and $l$ and which terminates at the front into a point $m$. The admission of air may instead be effected through a single pipe which, of course, has to be made correspondingly wider or it may be effected by means of more than two pipes. The hollow plate $j$ is shown as being arranged in the plane of the keel line. According to the modification illustrated in Figure 18, the horizontal hollow plate $j$ is arranged slightly below the horizontal plane of the keel line.

In the form of construction illustrated in Figures 19 and 20, the horizontal hollow plate $j$ is provided with direct continuations on both sides in the form of hollow vertical plates $n$ and $o$, which, for ensuring the object of the invention, are also run to a point, in order to reduce the front resistance. $p$, $q$ and $r$ are the air admission pipes for the three plates.

Figure 21 illustrates on a larger scale a modification of the combined arrangement of horizontal and vertical hollow plates, in which the horizontal hollow plate $j$ is partitioned in order to provide a subdivision of the compressed air, 1, 2, 3, 4, 5 and 6 being separate spaces of compressed air. Thus, for instance, the pressure in the compressed air spaces 5 and 6 may be higher than in the air spaces 1—4.

The front view of a construction in which a horizontal hollow plate is combined with lateral vertical hollow plates is shown in Fig. 15.

The blowing out of the air or the like is also illustrated, by way of example, in Figure 21. The air admission pipe $s$ may be provided with openings or slots $g$ from which the air can escape to the outside. The two air admission spaces $t$, $u$ provided in the air admission pipe $s$ may lead the air, for instance, to the two compressed air spaces 1 and 2 respectively provided in the hollow plate $j$. At the front edge of the hollow plate $j$ the openings may be provided with nozzles $h$. The compressed air spaces 5 and 6 lead to the air escape openings which are directed forwardly and may, of course, work under different pressures.

The pipes or pipe-like structures or hollow plates are secured to the ship by means of bracings $v$ and by the air admission pipes hereinbefore described and illustrated by way of example on the drawings.

Figure 28:
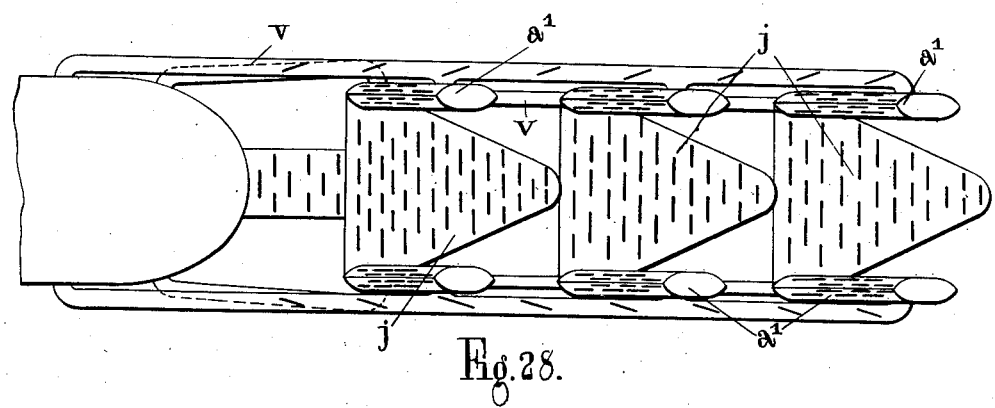

The constructional form of the invention illustrated in Figures 27 and 28 comprises horizontal plate-like hollow members *j* arranged one behind the other in stepped formation like the tubular members *b* in Figure 1, and lateral plate-like hollow members *a'*, inclined forward like the tubular members *a* in Figure 7, and forming, with the horizontal members *j*, a sort of U-shaped profile, as seen from the front, substantially resembling the profile of the vessel, as indicated in Figures 9 to 14. The slots are staggered, as in other forms, in order that the region in front of the hull may be filled as continuously as possible with air or gases. The hollow bodies are divided into separate compartments *i, i*, to which air at different pressures is supplied through the pipes *s, t, u*. The bracings *v* are here shown as pipes adapted to supply air to the hollow bodies, these bracings also being provided with apertures for the direct escape of air or gas.

It is to be understood that the number of air admission pipes may be varied as desired and that in any of the air admission pipes there may be provided any number of separate narrower air admission pipes. It is, however, to be borne in mind that the cross section of the air admission pipes, shall, if possible not be larger than the cross section of the lower horizontal parts *b* of the pipes used for blowing out the air and the like. It is also to be understood that the air admission pipes may be subdivided in any desired number of cells, chambers or channels. Further, the vertical hollow plates may also be provided with separate air admission pipes.

Wherever the word "ship" is used in this specification or in the claims appended thereto it is to be understood to include boats and the like vessels, whether the word "ship" is appropriately applicable thereto or not.

The invention is not limited to the details of construction hereinbefore given, by way of example, as the same may be modified in various respects without in any way departing from the spirit of the invention.

What I claim is:—

1. A method of reducing the displacement resistance and skin friction of ships, boats and the like, consisting in liberating a gaseous fluid in the form of threads, strips and the like, some distance in advance of the bow of the vessel, and thereby forming in front of the vessel a furrow of froth the density of which is substantially less than that of water.

2. In a ship construction an attachment, at a certain distance in front of the bow of the ship consisting of hollow members in open communication with the ship for the purpose of receiving a supply of a gaseous fluid under pressure and having outlet openings through which the said gaseous fluid can be blown out in such a direction that the water present between the bow of the ship and the said hollow members is copiously traversed by the gaseous fluid and the whole of the front surface of the ship lying under water comes in contact as uniformly as possible with the said gaseous fluid.

3. In a ship construction an attachment as claimed in claim 2 and in which the said hollow members as seen from the front are adapted to the profile of the ship.

4. In a ship construction an attachment as claimed in claim 2 and in which the outlet openings in the hollow members are in the form of slots.

5. In a ship construction an attachment as claimed in claim 2 and in which the outlet openings in the hollow members are in the form of slots which are staggered with respect to one another.

6. In a ship construction an attachment as claimed in claim 2 and in which the outlet openings have outlet nozzles.

7. In a ship construction an attachment as claimed in claim 2 in which the hollow members are subdivided into compartments for the admission of gaseous fluid under different pressures and for allowing it to be blown out through the outlet openings at different pressures.

8. In a ship construction an attachment at a certain distance in front of the bow of the ship, consisting of a plate-like hollow body at about the height of the horizontal plane of the keel line, a connecting pipe between the said plate-like hollow body and the ship for the passage of gaseous fluid under pressure from the ship into the said plate-like hollow body, outlet openings in the plate-like hollow body through which the gaseous fluid can be blown out in such a direction that the water present between the bow and the plate-like hollow body is copiously traversed by the gaseous fluid and the whole of the front surface of the ship lying under water comes in contact as uniformly as possible with the gaseous fluid, and bracings connecting the plate-like hollow body with the ship, said bracings having outlet openings through which the gaseous fluid can be blown out.

9. In a ship construction an attachment at a certain distance in front of the bow of the ship consisting of several plate-like hollow bodies arranged one behind the other at about the height of the horizontal plane of the keel line, a connecting pipe between the said plate-like hollow bodies and the ship for the passage of gaseous fluid under pressure from the ship into the said plate-like hollow bodies, outlet openings in the plate-like hollow bodies through which the gaseous fluid can be blown out in such a direction that the water present between the bow and the plate-like hollow bodies is copiously traversed by the gaseous fluid and the whole of the front surface of the ship lying under water comes in contact as uniformly as possible with the gaseous fluid, and bracings connecting the plate-like hollow bodies with the ship, said bracings having outlet openings through which the gaseous fluid can be blown out.

10. In a ship construction an attachment at a certain distance in front of the bow of the ship consisting of several plate-like hollow bodies arranged one behind the other in steps at about the height of the horizontal plane of the keel line, a connecting pipe between the said plate-like hollow bodies and the ship, for the passage of gaseous fluid under pressure from the ship into the said plate-like hollow bodies, outlet openings in the plate-like hollow bodies through which the gaseous fluid can be blown out in such a direction that the water present between the bow and the plate-like hollow bodies is copiously traversed by the gaseous fluid and the whole of the front surface of the ship lying under water comes in contact as uniformly as possible with the gaseous fluid, and bracings connecting the plate-like hollow bodies with the ship, said bracings having outlet openings through which the gaseous fluid can be blown out.

11. In a ship construction an attachment at a certain distance in front of the bow of the ship consisting of a bottom plate-like hollow body and of lateral plate-like hollow bodies arranged in an upward position in the direction of movement of the ship, the said bottom and lateral plate-like hollow bodies forming a U-shaped structure similar to the profile of the ship, means for establishing communication between the interior of the said plate-like hollow bodies and the ship for the passage of gaseous fluid under presure from the ship into the said plate-like hollow bodies and outlet openings in the plate-like hollow bodies through which the gaseous fluid can be blown out in such a direction that the water present between the bow and the plate-like hollow bodies is copiously traversed by the gaseous fluid and the whole of the front surface of the ship lying under water comes in contact as uniformly as possible with the gaseous fluid.

12. In a ship construction an attachment as claimed in claim 11, in which the means for the supplying of gaseous fluid from the ship to the plate-like hollow bodies comprise separate pipes for leading the gaseous fluid under different pressures to the different plate-like hollow bodies.

13. In a ship construction an attachment as claimed in claim 2 consisting of U-shaped systems of hollow members, the lateral limbs of which are inclined forwards.

14. In a ship construction an attachment as claimed in claim 2, in which the hollow members have a cross-section, in a plane transverse to the longitudinal axis of the ship which is only a fraction of the cross-section of the ship so far as the part that comes in contact with the water is concerned, for the purpose of considerably reducing in the front of the ship the resistance to the forward movement thereof.

15. In a ship construction an attachment as claimed in claim 2 and comprising bracings which connect the hollow members to the ship, the said bracings being hollow and capable of serving as admission pipes for the gaseous fluid to the hollow members.

16. In a ship construction an attachment as claimed in claim 2 comprising in addition hollow bracings connecting the hollow members to the ship, means for supplying gaseous fluid to the said bracings and outlet openings in the said bracings through which the gaseous fluid can be blown out for the purpose set forth.

17. In a ship construction an attachment at a certain distance ahead of the bow of the ship, consisting of a hollow member at about the level of the ship's bottom, a connecting pipe system between the said hollow member and the ship for the passage of gaseous fluid from the ship into the said hollow member, the hollow member being formed with outlet openings through which the gaseous fluid can be liberated in such a way that the water between the bow and the said hollow member and above the said hollow member is copiously traversed by the gaseous fluid and the whole of the submerged front surface of the ship and also a substantial portion of the adjacent submerged side surfaces of the ship come into contact as uniformly as possible with the gaseous fluid, and bracings connecting the hollow bodies with the ship, the said connecting pipe system and bracings also being formed with outlet openings through which the gaseous fluid can be liberated.

18. In a ship construction an attachment at a certain distance ahead of the bow of the ship, consisting of a plurality of hollow members arranged one behind the other at about the level of the ship's bottom, a connecting pipe system between the said hollow members and the ship for the passage of gaseous fluid from the ship into the said hollow members, the hollow members being formed with outlet openings through which the gaseous fluid can be liberated in such a way that the water between the bow and the said hollow members and above the said hollow members is copiously traversed by the gaseous fluid and the whole of the submerged front surface of the ship and also a substantial portion of the adjacent submerged side surfaces of the ship come into contact as uniformly as possible with the gaseous fluid, and bracings connecting the hollow bodies with the ship, the said connecting pipe system and bracings also being formed with outlet openings through which the gaseous fluid can be liberated.

19. In a ship construction an attachment at a certain distance ahead of the bow of the ship, consisting of a plurality of hollow members arranged one behind the other in steps at about the level of the ship's bottom, a connecting pipe system between the said hollow members and the ship for the passage of gaseous fluid from the ship into the said hollow members, the hollow members being formed with outlet openings through which the gaseous fluid can be liberated in such a way that the water between the bow and the said hollow members and above the said hollow members is copiously traversed by the gaseous fluid and the whole of the submerged front surface of the ship and also a substantial portion of the adjacent submerged side surfaces of the ship come into contact as uniformly as possible with the gaseous fluid, and bracings connecting the hollow bodies with the ship, the said connecting pipe system and bracings also being formed with outlet openings through which the gaseous fluid can be liberated.

20. In a ship construction an attachment at a certain distance ahead of the bow of the ship, consisting of a hollow member at about the level of the ship's bottom, lateral hollow members extending upwards from the lateral extremities of the first-mentioned hollow member to form a substantially U-shaped structure as seen from the front somewhat resembling the profile of the ship, means for establishing communication between the said hollow members and the ship for the passage of gaseous fluid from the ship into the said hollow members, the hollow members being formed with outlet openings through which the gaseous fluid can be liberated in such a way that the water between the bow and the said hollow member and above the said hollow member is copiously traversed by the gaseous fluid and the whole of the submerged front surface of the ship and also a substantial portion of the adjacent submerged side surfaces of the ship come into contact as uniformly as possible with the gaseous fluid, and bracings connecting the hollow bodies with the ship, the said communication means and bracings also being formed with outlet openings through which the gaseous fluid can be liberated.

21. In a ship construction an attachment at a certain distance ahead of the bow of the ship, consisting of a plurality of submerged hollow members, connecting pipes between the said hollow members and the ship adapted to supply gaseous fluid at different pressures to the various hollow bodies, the hollow members being formed with outlet openings through which the gaseous fluid can be liberated in such a way that the water between the bow and the said hollow members and above the said hollow members is copiously traversed by the gaseous fluid and the whole of the submerged front surface of the ship and also a substantial portion of the adjacent submerged side surfaces of the ship come into contact with the gaseous fluid.

22. In a ship construction an attachment, at a certain distance in front of the bow of the ship, consisting of hollow plate-like members in open communication with the ship for the purpose of receiving a supply of gaseous fluid and having outlet openings through which the said gaseous fluid can be liberated in such a way that the water between the bow of the ship and the said hollow members is copiously traversed by the gaseous fluid and the whole of the submerged front portion of the ship, and also a substantial portion of the ship's sides, come into contact as uniformly as possible with the said gaseous fluid.

23. In a ship construction an attachment as claimed in claim 22, in which the said hollow plate-like members as seen from the front are adapted substantially to the profile of the ship.

24. In a ship construction an attachment as claimed in claim 22, in which the outlet openings in the hollow plate-like members are in the form of slots.

25. In a ship construction an attachment as claimed in claim 22, in which the outlet openings in the hollow plate-like members are in the form of slots, which are staggered with respect to one another.

26. In a ship construction an attachment as claimed in claim 22 in which the outlet openings have outlet nozzles.

27. In a ship construction an attachment as claimed in claim 22, in which the outlet openings have outlet nozzles and are staggered with respect to one another.

28. In a ship construction an attachment as claimed in claim 2, in which the outlet openings have outlet nozzles and are staggered with respect to one another.

29. In a ship construction an attachment as claimed in claim 22, in which the hollow plate-like members are subdivided into compartments for the admission of gaseous fluid under different pressures and for allowing it to be liberated through the outlet openings at different pressures.

In testimony whereof I have signed my name to this specification.

JOHANN RUDOLF KLINGER.